US010365494B2

(12) United States Patent
Lin et al.

(10) Patent No.: US 10,365,494 B2
(45) Date of Patent: Jul. 30, 2019

(54) ADJUSTMENT STRUCTURE OF A BRIDLE

(71) Applicant: Acer Incorporated, New Taipei (TW)

(72) Inventors: Li Lin, New Taipei (TW); Ker-Wei Lin, New Taipei (TW); Chih-Kai Tu, New Taipei (TW); Chun-Ta Chen, New Taipei (TW); Chun-Yu Chen, New Taipei (TW)

(73) Assignee: Acer Incorporated, New Taipei (TW)

( * ) Notice: Subject to any disclaimer, the term of this patent is extended or adjusted under 35 U.S.C. 154(b) by 88 days.

(21) Appl. No.: 15/706,774

(22) Filed: Sep. 18, 2017

(65) Prior Publication Data

US 2018/0364490 A1    Dec. 20, 2018

(30) Foreign Application Priority Data

Jun. 20, 2017   (TW) .............................. 106120506 A

(51) Int. Cl.
| | |
|---|---|
| *G02B 27/01* | (2006.01) |
| *G02B 27/02* | (2006.01) |
| *A42B 1/24* | (2006.01) |
| *G06F 1/16* | (2006.01) |
| *A45F 5/00* | (2006.01) |

(Continued)

(52) U.S. Cl.
CPC .......... *G02B 27/0176* (2013.01); *A42B 1/245* (2013.01); *A45F 5/00* (2013.01); *B68B 1/04* (2013.01); *G02B 27/02* (2013.01); *G06F 1/163* (2013.01); *A42B 3/145* (2013.01); *A45F 2200/0516* (2013.01); *A45F 2200/0525* (2013.01); *A45F 2200/0533* (2013.01); *G02B 2027/0154* (2013.01); *G02B 2027/0159* (2013.01)

(58) Field of Classification Search
CPC ........................... Y10T 24/2187; A42B 3/145
See application file for complete search history.

(56) References Cited

U.S. PATENT DOCUMENTS

| | | | |
|---|---|---|---|
| 2,926,406 | A | 3/1960 | Edwards et al. |
| 3,325,824 | A | 6/1967 | Donegan et al. |

(Continued)

FOREIGN PATENT DOCUMENTS

| | | |
|---|---|---|
| CN | 203829144 | 9/2014 |
| CN | 105661735 | 6/2016 |

(Continued)

OTHER PUBLICATIONS

"Search Report of Europe Counterpart Application", dated May 14, 2018, p. 1-p. 7.

*Primary Examiner* — Robert Sandy
(74) *Attorney, Agent, or Firm* — JCIPRNET

(57) ABSTRACT

An adjustment structure of a bridle including a bridle, rotating shaft, and a knob is provided. The bridle has a rack. The rotating shaft has a first ring gear and a second ring gear both around an axis, wherein the first ring gear is coupled to the rack, such that the rotating shall moves along the bridle by rotating about the axis itself. The knob is rotated about the axis and moved along the axis to be movably coupled to the rotating shaft. The knob has a third ring gear to be engaged with or released from the second ring gear by the knob moving along the axis. When the third ring gear is engaged with the second ring gear, the knob is forced to drive the rotating shaft to rotate about the axis.

10 Claims, 6 Drawing Sheets

(51) Int. Cl.
*B68B 1/04* (2006.01)
*A42B 3/14* (2006.01)

(56) References Cited

U.S. PATENT DOCUMENTS

| | | | |
|---|---|---|---|
| 2004/0060154 A1 | 4/2004 | Landry | |
| 2008/0109947 A1 | 5/2008 | Dubois | |
| 2008/0184451 A1 | 8/2008 | Lemke et al. | |
| 2010/0050325 A1* | 3/2010 | Wang-Lee | A42B 3/145 2/418 |
| 2015/0107006 A1* | 4/2015 | Chen | A42B 3/324 2/418 |

FOREIGN PATENT DOCUMENTS

| | | |
|---|---|---|
| CN | 106019604 | 10/2016 |
| TW | M510637 | 10/2015 |

* cited by examiner

ADJUSTMENT STRUCTURE OF A BRIDLE

CROSS-REFERENCE TO RELATED APPLICATION

This application claims the priority benefit of Taiwan application serial no. 106120506, filed on Jun. 20, 2017. The entirety of the above-mentioned patent application is hereby incorporated by reference herein and made a part of this specification.

BACKGROUND

Technical Field

The disclosure is related to an adjustment structure of a bridle.

Description of Related Art

In terms of a wearable object such as a face mask, a mask, clothing, a backpack or even an electronic device, it is a common means to use a bridle to tie the wearable object to a user for ease of use or to prevent the wearable object from falling. To adapt to the shape of various wearable object as well as the position or use of the wearable object to be worn on the user, different bridle structures have also been developed correspondingly.

With rapid advancement of technologies, a head-mounted device integrated with an electronic module as a product have been developed over the last few years so that the electronic module is wearable on the user's head. For example, a display module is disposed on a head-mounted electronic device so that the user can directly see an image in front of the user's face.

In order for the user to adjust the display module to a suitable angle by himself/herself, the display module may be disposed on the head-mounted device via a bridle so it is easier for the user to wear it.

SUMMARY

The disclosure provides an adjustment structure of a bridle which allows user to make adjustment instinctively.

According to the disclosure, the adjustment structure of a bridle includes a bridle, a rotating shaft and a knob. The bridle has a rack. The rotating shaft has a first ring gear and a second ring gear both around an axis, wherein the first ring gear is coupled to the rack, such that the rotating shaft moves along the bridle by rotating about the axis. The knob is rotated about the axis and moved along the axis to be movably coupled to the rotating shaft. The knob has a third ring gear to be engaged with or released from the second ring gear by the knob moving along the axis. When the third ring gear is engaged with the second ring gear, the knob is forced to drive the rotating shaft to rotate.

In summary, according to the disclosure, in the adjustment structure of the bridle, with the coupling relationship of the rack and the first ring gear between the bridle and the rotating shah, the rotating action of the rotating shaft drives the rotating shaft to move along the rack so that the position of the rotating shift on the bridle can be adjusted. Since the knob is coupled to the rotating shaft, the knob is able to move along the bridle along with the rotating shaft. In other words, when a user applies a force to drive the knob to perform the rotating action, the position of the knob on the bridle can be changed. Relatively, it means that the user can manipulate the movement of the bridle so as to adjust the bridle.

Furthermore, the movement of the knob along the rotating shaft can further cause the third ring gear to be engaged with or not to be engaged with the second ring gear. When the knob and the rotating shaft are engaged with each other accordingly, the user can achieve the mode of adjusting the bridle by rotating the knob and the rotating shaft.

In order to make the aforementioned features and advantages of the invention more comprehensible, embodiments accompanying figures are described in detail below.

DESCRIPTION OF EMBODIMENTS

Figure 1:
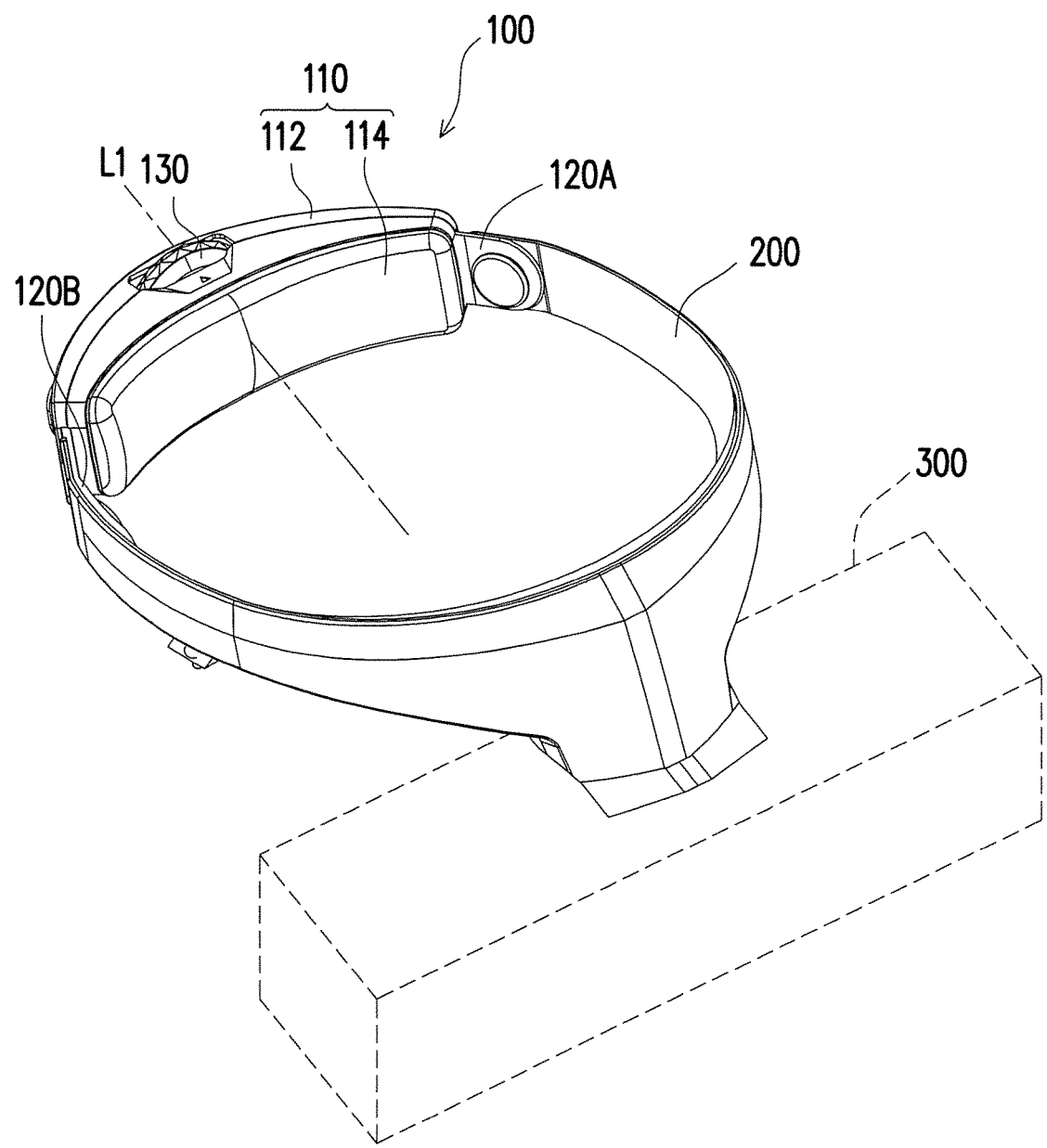
FIG. 1 is a schematic view illustrating an adjustment structure of a bridle according to an embodiment of the disclosure.
Figure 2:
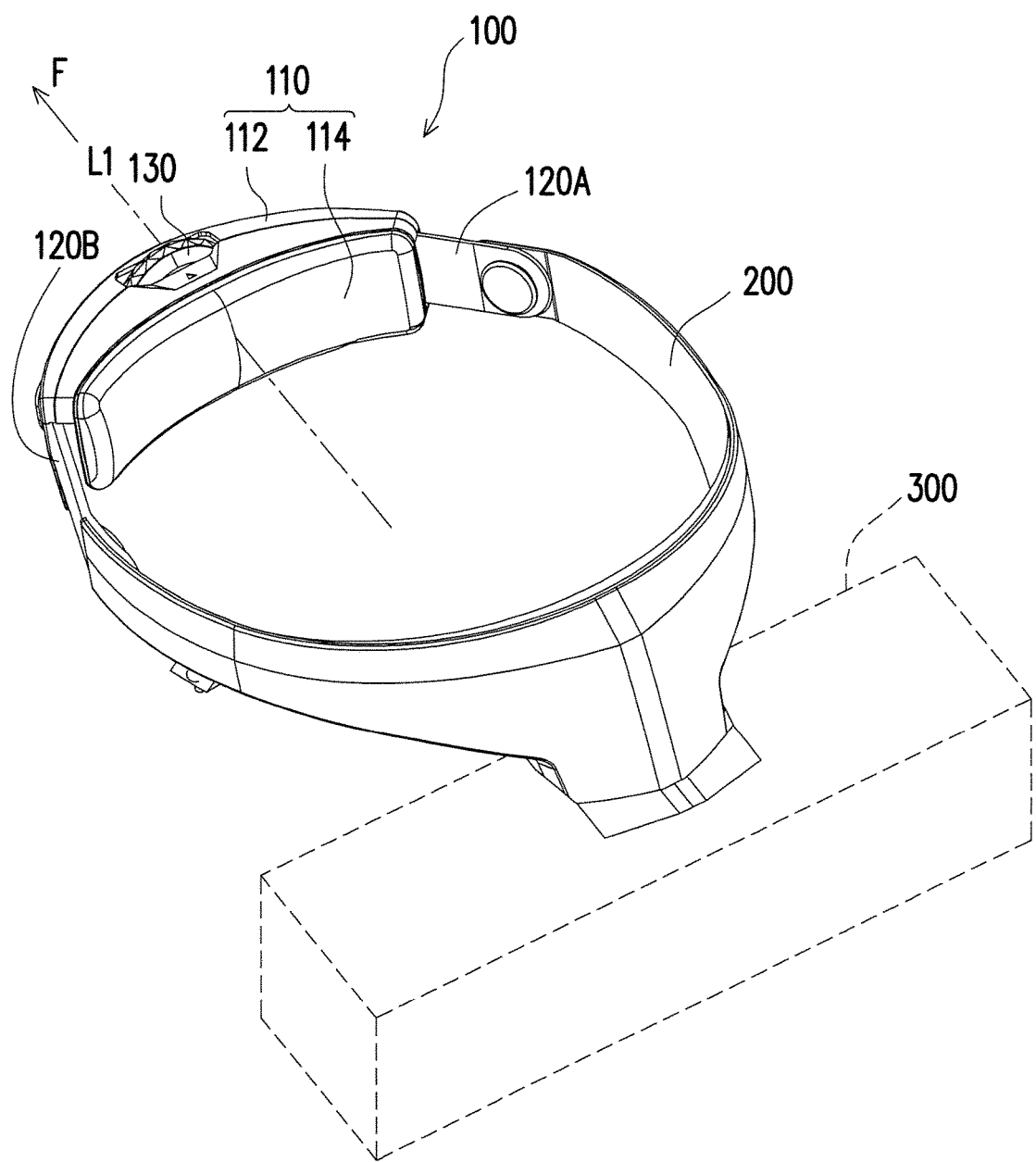
FIG. 2 is a schematic view illustrating the adjustment structure of a bridle of FIG. 1 in another state.

FIG. 1 is a schematic view illustrating an adjustment structure of a bridle according to an embodiment of the disclosure. FIG. 2 is a schematic view illustrating the adjustment structure of a bridle of FIG. 1 in another state. Referring to both of FIG. 1 and FIG. 2, in the embodiment, an adjustment structure of a bridle 100 includes bridles 120A and 120B, a belt body 200, a housing, 110 and a knob 130. Here, the belt body 200 is, for example, a head-mounted ring which is connected to an object 300 at a position away, from the bridles 120A and 120B. It is adaptable for a user to put the belt body 200 on the head so as to perform related actions on the object 300. The object 300 is, for example, an electronic device or a mask such as a display and the like; the disclosure provides no limitation to the form of the object. Here, the bridles 120A and 120B are respectively connected to two opposite ends of the belt body 200 and overlap each other in the housing 110. As shown in FIG. 1 and FIG. 2, when the user adjusts the knob 130 exposed from the housing 110, the user can adjust relative positions between the bridles 120A and 120B and the housing 110 accordingly, such that the portion of the bridles 120A and 120B exposed from the housing 110 can be extended or shortened, thereby achieving the purpose of adjusting the belt body 200 and the bridles 120A and 120B to fit the size of the user's head. In addition, the disclosure does not limit that the adjustment structure of bridle a 100 is used exclusively on the head. The adjustment structure of a bridle 100 may be adapted to a wearable device for other parts of human body.

Figure 3:
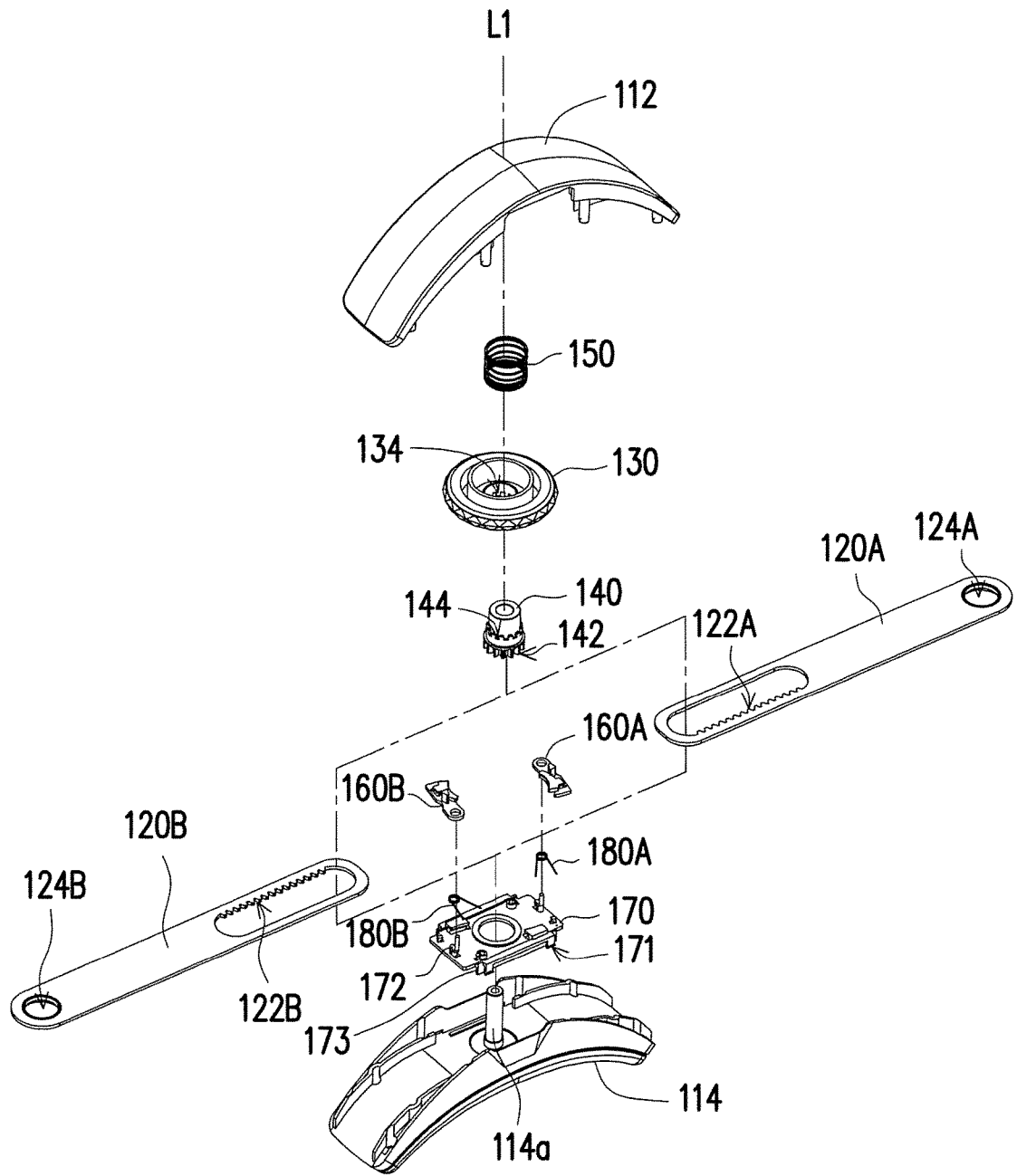
FIG. 3 is an explosive view illustrating the adjustment structure of a bridle of FIG. 1.

FIG. 3 is an explosive view illustrating the adjustment structure of a bridle of FIG. 1. Referring to FIG. 1 through FIG. 3, in the embodiment, the housing 110 includes an upper housing 112 and a lower housing 114. The adjustment structure of a bridle 100 further includes a rotating shaft 140 and a carrier 170, wherein the bridles 120A and 120B each has an opening hole and racks 122A and 122B in the opening hole. The carrier 170 is sleeved on a pillar 114a of the lower housing 114. The bridles 120A and 120V are movably combined with a bottom portion 173 of the carrier 170 so that the bridles 120A and 120B are substantially movably penetrated between the carrier 170 and the lower housing 114 when the carrier 170 is assembled on the lower housing 114 via a locking portion 171. It also means that the carrier 170 may be regarded as being movably disposed on the bridles 120A and 120B.

Furthermore, the bridles 120A and 120B are flexible so that the contour of the bridles can be changed along with the contour of surrounding structure. In the embodiment, the bridles 120A and 120B can be formed to have an arc-shaped contour in line with the contour of the upper housing 112, the lower housing 114 and the belt body 200 so that a closed contour formed by the housing 110, the bridles 120A and 120B and the belt body 200 can be worn on the user's head smoothly. The size of the closed contour can fit the size of the user's head.

The rotating shaft 140 passes through an opening of the carrier 170 to be sleeved on a pillar 114a, and the rotating shaft 140 has a first ring gear 142 and a second ring gear 144 both around an axis L1, wherein the first ring gear 142 is coupled to the racks 122A and 122B of the bridles 120A and 120B. Here, the racks 122A and 122B are substantially coupled to two opposite sides of the first ring gear 142. In this manner, with the cooperation between the first ring gear 142 and the racks 122A and 122B, when the rotating shaft 140 rotates about the axis L1, the rotating shaft 140 can move along the racks 122A and 122B in the opening hole; that is, the positions of the carrier 170 and the housing 110 as well as the rotating shaft 140 on the bridles 120A and 120B can thus be changed. Relatively, if the rotating shaft 140 is in a fixed state (which means that the carrier 170 and the housing 110 are also in a fixed state), it means that the bridles 120A and 120B can thus be dislocated relative to the rotating shaft 140. In other words, the bridles 120A and 120B can thus generate an effect of being pulled out of or retracted back to the housing 110. With reference to FIG. 1 and FIG. 2, since the bridles 120A and 120B are respectively combined with the belt body 200 via fixing holes 124A and 124B, it represents that, when the bridles 120A and 120B are pulled out of the housing 110, a relative distance between the housing 110 and the belt body 200 is increased. In other words, the size encircled by the housing 110, the bridles 120A and 120B and the belt body 200 is increased. When the bridles 120A and 120B are retracted back to the housing 110, the relative distance between the housing 110 and the belt body 200 is shortened. That is, the size encircled by the housing 110, the bridles 120A and 120B and the belt body 200 is reduced. Accordingly, the size formed by the housing 110, the bridles 120A and 120B and the belt body 200 to be put on the user's head can be changed, thereby making adjustment to loosen or tighten the bridle.

Figure 4:
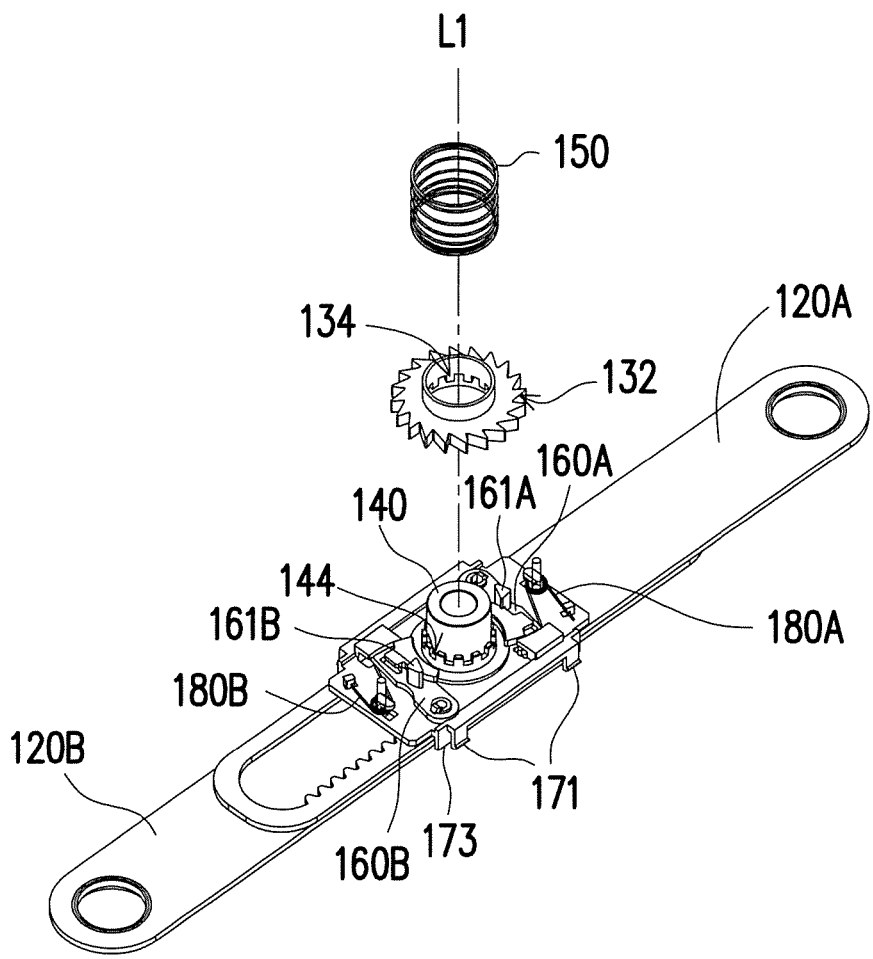
FIG. 4 and FIG. 5 are schematic views illustrating partial components of an adjustment structure of a bridle in different viewing angles.
Figure 5:
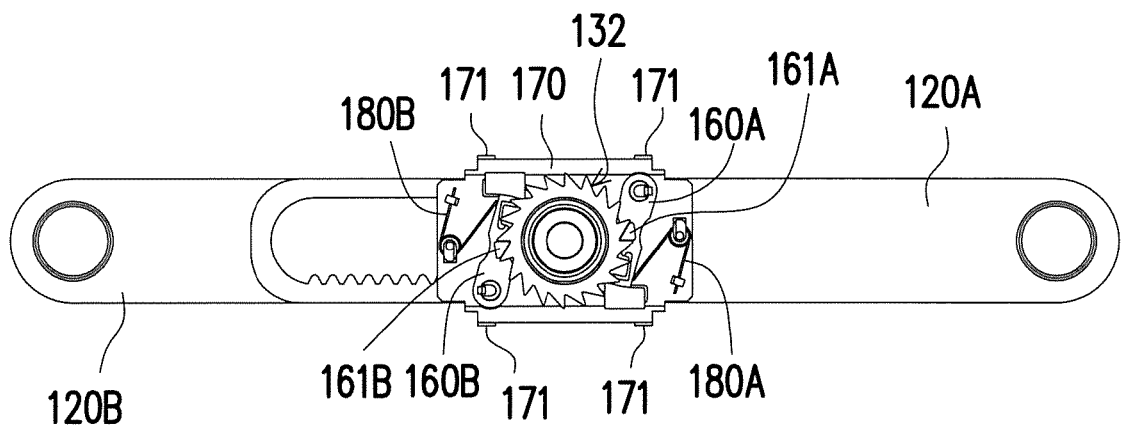
Figure 6:
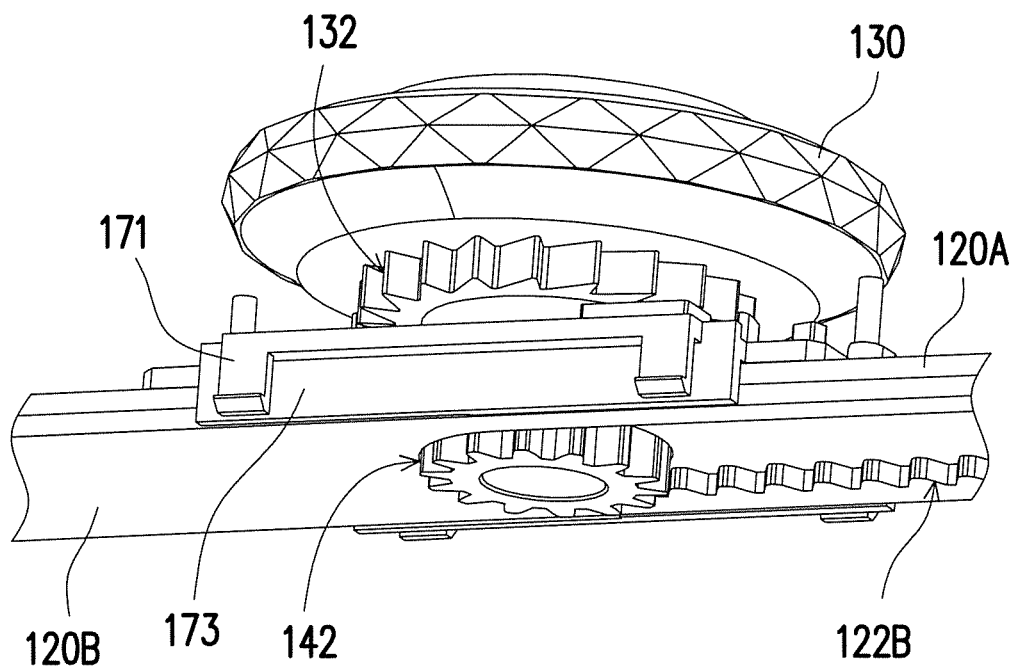
FIG. 6 is a partial schematic view illustrating an adjustment structure of a bridle in another viewing angle.

FIG. 4 and FIG. 5 are schematic views respectively illustrating partial components of an adjustment structure of a bridle in different viewing angles. FIG. 6 is a partial schematic view illustrating an adjustment structure of a bridle in another viewing angle. Referring to FIG. 6 first, as described above, the bridles 120A and 120B are movably penetrated through the bottom portion 173 of the carrier 170, allowing the racks 122A and 122B to be coupled to the first ring gear 142 so that the bridles 120A and 120B can move to the left or right as illustrated in the drawing, thereby achieving the effect of adjusting the bridles 120A and 120B.

Figure 7A:
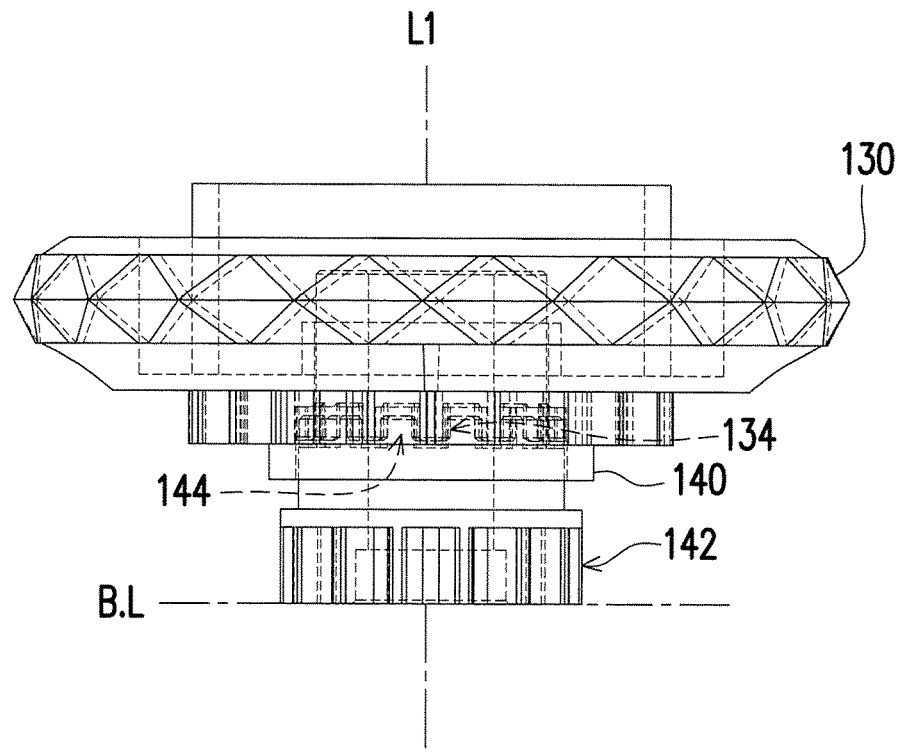
FIG. 7A and FIG. 7B are schematic views respectively illustrating a knob and a rotating shaft in different states.
Figure 7B:
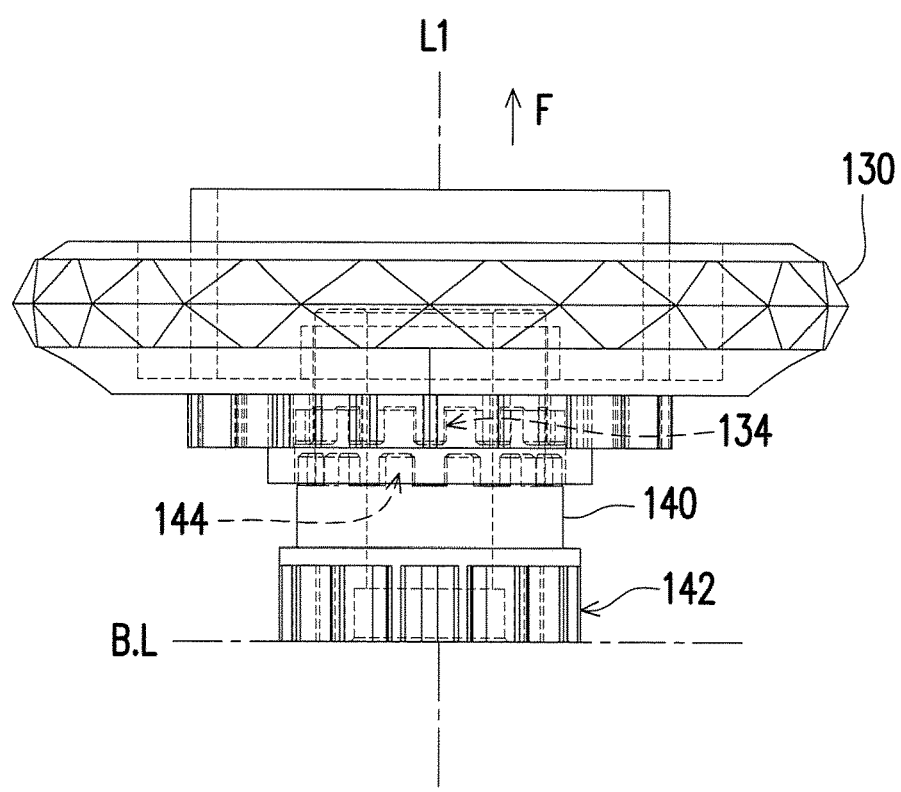

However, there is a precondition for the adjusting action performed by rotating the rotating shaft in cooperation with the bridles. Referring to FIG. 3 through FIG. 5, it should be pointed out that FIG. 4 and FIG. 5 only illustrate a part of the structure of the knob 130 for ease of describing the related components. In the embodiment, the adjustment structure of a bridle 100 further includes a first elastic element 150 which abuts between the upper housing 112 and knob 130 of the housing 110. The knob 130 is rotated about the axis L1 and is moved along the axis L1 to be rotatably sleeved on the rotating shaft 140; that is, the knob 130 can move along the rotating shaft 140 (the knob 130 and the rotating shaft 140 are jointed coaxially). FIG. 7A and FIG. 7B are schematic views respectively illustrating a knob and a rotating shaft in different states. Referring to FIG. 4, FIG. 7A and FIG. 7B, it should be indicated that the knob 130 has a third ring gear 134 which extends along and surrounds the axis L1 together with the second ring gear 144 of the rotating shaft 140, and the second ring gear 144 and the third ring gear 134 are opposite to each other. In the meantime, the first elastic element 150 permanently drives the knob 130 to move toward the rotating shaft 140. In this manner, the relative relationship between the knob 130 and the rotating shaft 140 is in two modes as illustrated in FIG. 7A and FIG. 7B.

In FIG. 7A, the knob 130 is driven by the first elastic element 150 to move toward the rotating shaft 140 and makes the third ring gear 134 and the second ring gear 144 to be engaged with other, so that the user rotates the knob 130 to drive the rotating shaft 140 to rotate about the axis L1; such mode is the precondition of the above-mentioned adjusting action. On the other hand, in FIG. 7B, the knob 130 is moved by being subjected to an external force F and thus the third ring gear 134 is moved away from the second ring gear 144 to release each other. At this point, the rotating shaft 140 and the bridles 120A and 120B are in a free state; that is, the relative relationship between the rotating shaft 140 and the bridles 120A and 120B is subject to change depending on the effect of external force applied thereto.

Furthermore, referring to both of FIG. 2 and FIG. 7B, both of which can correspond to each other in terms of state of use. As shown in the drawings, when the user applies the external force F to drive the third ring gear 134 of the knob 130 to be released from the second ring goat 144, the direction of the external three F faces away from the belt body 200, that is, while the user applies the external force F to the knob 130, it represents that the user applies a force away from the belt body 200 to the housing 110. Therefore, it the free state, the housing 110 can be gradually moved away from the belt body 200 along with the external force F applied thereto; such action represents that the adjustment structure of a bridle 100 is in a state that allows the size formed by the housing 110, the bridles 120A and 120B and the belt body 200 to be increased gradually so as to be loosened. In this manner, the user can easily increase the size encircled by the housing 110, the bridles 120A and 120B and the belt body 200 simply by applying the external force F without performing an additional unlocking action. It is equivalent to that, by applying the external force F, the state that the housing 110, the bridles 120A and 120B and the belt body 200 that originally fits the user's head can be changed to a loosened state immediately.

Relatively, when the size encircled by the housing 110, the bridles 120A and 120B and the belt body 200 is to be reduced, it is required to remove (release) the external force F so that the first elastic element 150 can drive the knob 130 to move toward the rotating shaft 140 again via an elastic force such that the third ring gear 134 is engaged with the second ring gear 144 again, thereby forming the above-mentioned adjusting state. Here, an extending direction of the first ring gear 142 is substantially orthogonal to an extending direction of the second ring gear 144 and an extending direction of the third ring gear 134 respectively.

Referring to FIG. 4 through FIG. 6, it should pointed out that the knob 130 further has a fourth ring gear 132 around the axis L1, and the adjustment structure of a bridle 100 further includes positioning elements 160A and 160B movably disposed on the carrier 170. Here, one end of the positioning elements 160A and 160B is pivoted to the carrier 170 and the other end is in a free state. Accordingly, the positioning elements 160A and 160B can rotate on the carrier 170. The adjustment structure of a bridle 100 further includes second elastic elements 180A and 180B respectively assembled on the carrier 170 and respectively abut against the positioning elements 160A and 160B. Here, the second elastic elements 180A and 180B permanently drive the positioning elements 160A and 160B to rotate toward the knob 130 so that retaining units 161A and 161B of the positioning elements 160A and 160B abut against the fourth ring gear 132. It should be mentioned that the fourth ring gear 132 is a unidirectional gear structure around the axis L1. When the positioning elements 160A and 160B abut against the fourth ring gear 132 (see FIG. 5), the fourth ring gear 132 can only rotate about the axis L1 along a single direction. In the embodiment, the fourth ring gear 132 in FIG. 5 makes the knob 130 to rotate only in a clockwise direction. Here, an extending direction of the fourth ring gear 132 is also orthogonal to the extending direction of the second ring gear 144 and the extending direction of the third ring gear 134 respectively.

In summary, when the knob 130 rotates in a clockwise direction as shown in FIG. 5, the rotating shaft 140 is driven to rotate in the clockwise direction as well so as to move the bridles 120A and 120B and increase the overlapping area; accordingly, the loosing state in FIG. 2 is changed to the tightening state in FIG. 1. That is, by retracting the bridles 120A and 120B back to the housing 110, the size encircled by the housing 110, the bridles 120A and 120B and the belt body 200 can be reduced, and thus the user feels a sense of gradual tightness. In this manner, with the two use modes of loosening and tightening the adjustment structure of a bridle 100, the belt body 200 can be smoothly sleeved on and carried on the user's head. For example, the user applies the external force F first to loosen the size encircled by the housing 110, the bridles 120A and 120B and the belt body 200. After the size is sleeved on the user's head, the external force F is released so that the knob 130 is engaged with the rotating shaft 140 such that the size can be gradually tightened via the action of rotating the knob 130. Eventually, the size encircled by the housing 110, the bridles 120A and 120B and the belt body 200 can fit the user's head.

In summary, according to the disclosure, in the adjustment structure of the bridle, with the coupling relationship of the rack and the first ring gear between the bridle and the rotating shaft, the rotating action of the rotating shaft drives the rotating shaft to move along the rack so that the position of the rotating shift on the bridle can be adjusted. Since the knob is coupled to the rotating shaft, the knob is able to move along the bridle along with the rotating shaft. In other words, when the user applies a force to drive the knob to perform the rotating action, the position of the knob on the bridle can be changed. Relatively, it means that the user can manipulate the movement of a bridle so as to adjust the bridle.

In summary, when the knob 130 rotates in a clockwise direction as shown in FIG. 5, the rotating shaft 140 is driven to rotate in the clockwise direction as well so as to move the bridles 120A and 120B and increase the overlapping area; accordingly, the loosing state in FIG. 2 is changed to the tightening state in FIG. 1. That is, by retracting the bridles 120A and 120B back to the housing 110, the size encircled by the housing 110, the bridles 120A and 120B and the belt body 200 can be reduced, and thus the user feels a sense of gradual tightness. In this manner, with the two use modes of loosening and tightening the adjustment structure 100 of bridle, the belt body 200 can be smoothly sleeved on and carried on the user's head. For example, the user applies the external force F first to loosen the size encircled by the housing 110, the bridles 120A and 120B and the belt body 200. After the size is sleeved on the user's head, the external force F is released so that the knob 130 is engaged with the rotating shaft 140 such that the size can be gradually tightened via the action of rotating the knob 130. Eventually, the size encircled by the housing 110, the bridles 120A and 120B and the belt body 200 can fit the user's head.

In summary, according to the disclosure, in the adjustment structure of the bridle, with the coupling relationship of the rack and the first ring gear between the bridle and the rotating shaft, the rotating action of the rotating shaft drives the rotating shaft to move along the rack so that the position of the rotating shift on the bridle can be adjusted. Since the knob is coupled to the rotating shaft, the knob is able to move along the bridle along with the rotating shaft. In other words, when the user applies a force to drive the knob to perform the rotating action, the position of the knob on the bridle can be changed. Relatively, it means that the user can manipulate the movement of bridle so as to adjust the bridle.

In other words, for the user, applying the external force makes the knob and the ring gear of the rotating shaft to release each other. Meanwhile, the direction of the external force faces away from the belt body so that the user can move the housing away from the belt body smoothly along the direction of the external force, such that the size encircled by the housing, the bridles and the belt body is increased so as to achieve the loosening state. Relatively, once the structure in the loosening state is sleeved on the user's head, by releasing the external force and rotating the knob, since the ring gear of the knob is a unidirectional structure in cooperation with the positioning elements, the knob can only rotate in a single direction in cooperation with the rack of the bridle so that the overlapping portion of the bridle can gradually increase through the unidirectional rotation. Accordingly, the size encircled by the housing, the bridles and belt body can be reduced and the tightening state can be generated until the housing, the bridles and the belt body can be smoothly carried on the user's head for use.

Although the invention has been disclosed by the above embodiments, the embodiments are not intended to limit the invention. It will be apparent to those skilled in the art that various modifications and variations can be made to the structure of the invention without departing from the scope or spirit of the invention. Therefore, the protecting range of the invention falls in the appended claims.

What is claimed is:

1. An adjustment structure of a bridle, comprising:
   a bridle, comprising a rack;
   a rotating shaft, comprising a first ring gear and a second ring gear both around an axis, wherein the first ring gear and the rack are coupled to each other so that the rotating shaft moves on the bridle by rotating about the axis; and a knob, rotating about the axis and moved along the axis to be coupled to the rotating shall, the knob comprising a third ring gear to be engaged with or released from the second ring gear by the knob moving along the axis, when the third ring gear is engaged with the second ring gear, the knob adapted to be subjected to an external force to simultaneously drive the rotating shaft to rotate.

2. The adjustment structure of a bridle according to claim 1, further comprising:
a carrier, movably disposed on the bridle, the rotating shaft and the knob rotatably disposed on the carrier, the rotating shaft rotates to change a position of the carrier on the bridle.

3. The adjustment structure of a bridle according to claim 2, further comprising:
a housing, the rotating shaft and the knob movably assembled to the housing, the carrier assembled in the housing, a portion of the knob exposed from the housing, the bridle movably penetrated through the housing, the housing moving relative to the bridle along with the carrier; and
a first elastic element, abutting between the housing and the knob, the first elastic element permanently driving the knob to move toward the rotating shaft so that the third ring gear is engaged with the second ring gear.

4. The adjustment structure of a bridle according to claim 2, further comprising:
a positioning element, movably disposed on the carrier; and
a second elastic element assembled to the carrier and abutting against the positioning element, the second elastic element permanently driving the positioning element to move toward the knob and abutting against a fourth ring gear of the knob.

5. The adjustment structure of a bridle according to claim 4, wherein the fourth ring gear is it unidirectional gear structure round the axis, when the positioning element abuts against the fourth ring gear, the fourth ring gear rotates about the axis in a single direction.

6. The adjustment structure of a bridle according to claim 2, further comprising:
a. belt body, an end of the bridle fixed to the belt body, the rack disposed on another end of the bridle, the carrier changes a position thereof on the rack via rotation of the rotating shaft so as to adjust a relative distance between the housing and the belt body.

7. The adjustment structure of a bridle according to claim 6, wherein the knob is adapted to move toward a direction along the axis so that the third ring gear is released from the second ring gear, and the direction faces away from the belt body.

8. The adjustment structure of a bridle according to claim 6, wherein the belt body is a head-mounted ring.

9. The adjustment structure of a bridle according to claim 1, wherein the bridle is flexible so as to be in line with a contour of the belt body and the housing.

10. The adjustment structure of a bridle according to claim 1, wherein the knob and the rotating shaft are jointed coaxially.

* * * * *